United States Patent
Dyk

(10) Patent No.: US 11,537,981 B2
(45) Date of Patent: Dec. 27, 2022

(54) PRODUCED PHYSICAL BULK ASSET HAULING DISPATCH SYSTEM

(71) Applicant: KSR Unlimited LLC, Franktown, CO (US)

(72) Inventor: Wesley Orin Dyk, Franktown, CO (US)

(73) Assignee: KSR UNLIMITED LLC, Castle Rock, CO (US)

(*) Notice: Subject to any disclaimer, the term of this patent is extended or adjusted under 35 U.S.C. 154(b) by 723 days.

(21) Appl. No.: 16/426,896

(22) Filed: May 30, 2019

(65) Prior Publication Data

US 2019/0370735 A1 Dec. 5, 2019

Related U.S. Application Data

(60) Provisional application No. 62/680,178, filed on Jun. 4, 2018.

(51) Int. Cl.
| | |
|---|---|
| *G06Q 10/08* | (2012.01) |
| *H04L 29/06* | (2006.01) |
| *G06Q 30/06* | (2012.01) |
| *G08G 1/00* | (2006.01) |
| *G06Q 10/04* | (2012.01) |

(52) U.S. Cl.
CPC ......... *G06Q 10/087* (2013.01); *G06Q 10/047* (2013.01); *G06Q 10/08355* (2013.01); *G08G 1/202* (2013.01)

(58) Field of Classification Search
CPC .............. G06Q 10/087; G06Q 10/047; G06Q 10/08355; G08G 1/202
See application file for complete search history.

(56) References Cited

U.S. PATENT DOCUMENTS

| | | | |
|---|---|---|---|
| 10,783,507 B1* | 9/2020 | Votolato | G06Q 10/087 |
| 2006/0241986 A1 | 10/2006 | Harper | |
| 2007/0106680 A1* | 5/2007 | Haot | G06F 16/40 |
| 2009/0307063 A1 | 12/2009 | Ayala et al. | |
| 2012/0191272 A1* | 7/2012 | Andersen | B66F 9/24 |
| | | | 705/28 |
| 2014/0234059 A1* | 8/2014 | Thomeer | B60P 3/14 |
| | | | 702/6 |
| 2016/0217399 A1 | 7/2016 | Roelofs et al. | |
| 2021/0004754 A1* | 1/2021 | Votolato | G06Q 10/087 |
| 2021/0192442 A1* | 6/2021 | Avidar | G06Q 30/04 |

* cited by examiner

*Primary Examiner* — Talia F Crawley
(74) *Attorney, Agent, or Firm* — Holzer Patel Drennan

(57) ABSTRACT

Utilities (e.g., systems, methods, etc.) that deliver a streamlined process to users for making decisions that minimize cost and maximize production in the hauling of produced physical bulk assets (e.g., liquids, sand, etc.) to various destinations. The utilities can be used by producers and carriers in various manners to drive their unique interests in hauling and has representation for production operators or producers, carriers, and destinations.

20 Claims, 14 Drawing Sheets

Site List

| NAME | CORPORATION | DIVISION | BUSINESS UNIT | DISTRICT | AREA | ROLE | ACTION |
|------|-------------|----------|---------------|----------|------|------|--------|
| ALBERTSON 0000 | Cherry Valley Operating | USA | Rockies | DJ Basin | East | SOURCE | |
| ALBERTSON 0001 | Cherry Valley Operating | USA | Rockies | DJ Basin | East | SOURCE | |
| ALBERTSON 0002 | Cherry Valley Operating | USA | Rockies | DJ Basin | West | SOURCE | |
| ALBERTSON 0003 | YELLOWSTONE DISPOSALS | USA | Rockies | DJ Basin | East | DESTINATION | |
| ANDERSON 0000 | Cherry Valley Operating | USA | Rockies | DJ Basin | West | SOURCE | |
| ANDERSON 0001 | Cherry Valley Operating | USA | Rockies | DJ Basin | West | SOURCE | |
| ANDERSON 0002 | Cherry Valley Operating | USA | Rockies | DJ Basin | West | SOURCE | |
| ANDERSON 0003 | Cherry Valley Operating | USA | Rockies | DJ Basin | West | SOURCE | |
| ANDERSON 0004 | Cherry Valley Operating | USA | Rockies | DJ Basin | West | SOURCE | |

Site List (Plankton Reuse Company)

| NAME | CORPORATION | DIVISION | BUSINESS UNIT | DISTRICT | AREA | ROLE | ACTION |
|---|---|---|---|---|---|---|---|
| | Cherry Valley Oper... | USA | Rockies | DJ Basin | West | SOURCE | |
| | Cherry Valley Oper... | USA | Rockies | DJ Basin | West | SOURCE | |
| | Cherry Valley Oper... | USA | Rockies | DJ Basin | West | SOURCE | |
| | Cherry Valley Oper... | USA | Rockies | DJ Basin | West | SOURCE | |
| | Cherry Valley Oper... | USA | Rockies | DJ Basin | East | SOURCE | |
| | Cherry Valley Oper... | USA | Rockies | DJ Basin | East | SOURCE | |
| | Cherry Valley Oper... | USA | Rockies | DJ Basin | West | SOURCE | |
| | Cherry Valley Oper... | USA | Rockies | DJ Basin | West | SOURCE | |

PRODUCED PHYSICAL BULK ASSET HAULING DISPATCH SYSTEM

CROSS REFERENCE TO RELATED APPLICATION

This application claims the priority benefit of U.S. Provisional App. No. 62/680,178, entitled "PRODUCED LIQUID HAULING DISPATCH SYSTEM," and filed on Jun. 4, 2018, the entire contents of which is incorporated herein in its entirety as if set forth in full.

BACKGROUND

1. Field of the Invention

The present invention generally relates to the management and shipment of physical bulk assets such as liquids, sand, and the like and, more particularly, to identifying and implementing optimal volumes of physical bulk assets at various sites and shipments of such optimal volumes between sites.

2. Relevant Background

The logistics involved with selling physical bulk assets such as liquid assets (e.g., petroleum products, salt water, etc.) in the absence of pipeline infrastructure involve the local inventory at tank batteries and trucking capacity. There are many aspects of transportation in general that apply to the transportation of liquids produced in production operations. Many times, a delivery occurs between a single tank battery and market or other common delivery point. The single truck delivery is referred to as a load, where each hauled load costs the operator an amount determined by contract. The contracted fees can vary by load size, distance, and product.

Destinations may be one or more markets and/or various other delivery points. For instance, destinations such as disposal wells typically exist at different locations around a field, where such wells are used for safe disposal of waste water from production operations. In specific scenarios, product is picked up from two or more tank batteries before delivering the liquids (referred to as a "split load"). While hauling from multiple locations in one truck load is common with water, it is most common to haul from a single location when transporting oil and condensate. A common situation is having only a single market for oil and condensate, dependent upon existing contracts or location. In more complex situations, multiple destinations can receive the product from a particular tank battery. In situations where products are dedicated to specific destinations, the number of decisions is reduced.

SUMMARY

Managing the resources to handle inventory, transportation, and disposition of liquid products is a highly complex task. The dispatch process represents a large amount of time spent by producers and carriers to provide adequate direction to complete the necessary work. Each type of user can have different interests, depending upon the relationship between producer, carrier and destination. Seeking operational efficiency in such management and transportation can be aided through the use of optimization models. Producers (e.g., petroleum exploration and production company) are typically interested in fully utilizing their hauling capacity and maintaining flow assurance or in other words the successful and economical flow of fluids (e.g., hydrocarbons) from sources (e.g., reservoirs, tanks) to destinations (e.g., point of sale, etc.). Accordingly, some existing optimization models receive input such as production forecasts, existing inventory levels, and macro hauling capacity and generate output representing optimal levels of fluids to maintain in inventory and to be shipped to efficiently utilize their hauling capacity and maintain flow assurance.

Producers typically enter into different pricing arrangements with different carriers to transport liquid deliveries in various manners. Furthermore, producers can realize various profit levels by sending produced liquids into different markets. Accordingly, there are existing optimization models that receive inputs such as carrier contract parameters (e.g., in relation to prices, etc.), any dedicated carrier requirements (e.g., carriers that only haul certain liquid types, volume thresholds, etc.), market rates, and the like and generate output that aims to minimize delivery costs. For instance, such output may recommend that one or more particular carriers should be used to haul one or more particular loads into one or more particular markets in order to minimize such delivery costs. There are also industry standard vehicle routing models to minimize time, mileage, and/or other costs incurred in delivering requested loads from sources to destinations or markets. Operators who control truck shifts can act as operators and use such models with their own cost interests included to minimize their expenditure in hauling. For instance, a carrier can utilize the models by receiving load requests from one or more operators and designing truck shifts to meet the requirements of the operators while minimizing their own costs.

While the above-discussed known optimization models can be useful in an ad hoc manner, the inventor has determined that a single system incorporating all of such optimization models is needed where such system would be capable of serving multiple types of customers (e.g., producers, carriers, etc.) and would be able to substantially seamlessly transfer outputs from one models into the input of another model to optimize outputs by downstream models. In this regard, disclosed herein are various utilities (e.g., systems, methods, etc.) that deliver a streamlined process to users for making decisions that minimize cost and maximize production in the hauling of produced physical bulk assets to various destinations. The system can be used by producers and carriers in various manners to drive their unique interests in hauling and has representation for production operators or producers (e.g., oil and gas exploration and production company), carriers (e.g., oil or water haulers), and destinations (e.g., water disposal or recycle operator or oil market).

The disclosed system is capable of sharing necessary data between operators and carriers without granting complete access to the other's data. For instance, a producer interested in only particular mechanisms in the complete process (e.g., only in relation to optimal inventory levels, carriers, and markets) can supply producer specific input to the system (which may include one or more producer-specific restraints) and receive output recommendations by the system in relation to trucks, loads, destinations, and the like. Continuing with this example, a particular hauler contracted with the producer may utilize a different mechanism of the system to optimize routing for the recommendations outputted by the system in relation to the producer but free of access to the producer specific data inputted into the system by the producer. The disclosed system may generate data (e.g., producing location, the amount to haul, the earliest arrival time, the latest departure time, the carrier, the truck, and the destination) for a carrier to complete a haul from a producing location to a destination in a manner that optimizes parameters for system users.

In one aspect disclosed herein, a method for use in facilitating transport of physical bulk assets between sites in a network is disclosed. The recited method includes receiving, at a processor, first input data regarding physical bulk assets of a network made up of a plurality of physical sites in a geographic area, the first input data including a current inventory of the physical bulk assets in the network, forecasted production of physical bulk assets at one or more of the plurality of physical sites in the network, a current capacity to store physical bulk assets at sites in the network, and a hauling capacity by carriers accessible to the network; generating by the processor at least one optimized load data package that is configured to maintain flow assurance of physical bulk assets in the network, the generating the at least one optimized load package including executing at least a first optimization model using the first input data; generating by the processor at least one optimized carrier assignment data package that is configured to limit a cost to deliver physical bulk assets between sites in the network using the carriers, the generating the at least one optimized carrier assignment data package including executing at least a second optimization model using the at least one optimized load data package; and sending by the processor the at least one optimized carrier assignment data package for presentation on a display.

As an example, the at least one optimized load data package may include at least one first volume of at least one physical bulk asset in the network to be transported from at least one source site in the network to at least one destination site in the network by at least one first deadline. For instance, the optimized load data package may include the source or producing site, the carrier and truck(s), the volume and type of bulk asset to haul, the destination site, the latest departure time from the source site, and/or the earliest arrival time at the destination site. In one arrangement, the method may also include receiving at least one requested load data package, and the method may further include determining, by the processor, whether at least one conflict or inconsistency exists between the at least one optimized load data package and the at least one requested load data package; and generating, by the processor, at least one indication regarding the determination for presentation on the display. For instance, the requested load data package may include one or more producer-specific constraints (e.g., in relation to deadlines, minimum or maximum capacities, etc.) and at least one inconsistency may be identified when one or more portions of the optimized load data package fail to comply with the one or more constraints.

In response to a determined inconsistency, a user may choose to override the inconsistency such that the optimized assignment data package is generated on the basis of the optimized load data package with the inconsistencies. Alternatively, a user may be prompted to submit revised first input data whereupon the revised optimized load data package may be generated which may again by analyzed in view of the requested load data package to check for inconsistencies.

In one arrangement, the method may further include generating at least one optimized physical bulk asset routing data package that is configured to limit a cost to deliver the physical bulk assets between sites in the network using the carriers, the generating the at least one optimized physical bulk asset routing data package including executing at least a third optimization model using the at least one optimized load data package and the at least one optimized carrier assignment data package. For instance, the at least one optimized physical bulk asset routing data package may specify at least one specific route (e.g., directions that include roads, highways, etc.) to be traveled by the at least one carrier to transport the at least one first volume of the at least one liquid asset in the network from the at least one source site in the network to the at least one destination site in the network by the at least one first deadline.

In addition to the exemplary aspects and embodiments described above, further aspects and embodiments will become apparent by reference to the drawings and by study of the following descriptions.

BRIEF DESCRIPTION OF THE DRAWINGS

FIGS. 5a-5j present various screenshots of a user interface that provides access to the optimization engine of FIG. 2.

DETAILED DESCRIPTION

Figure 1:
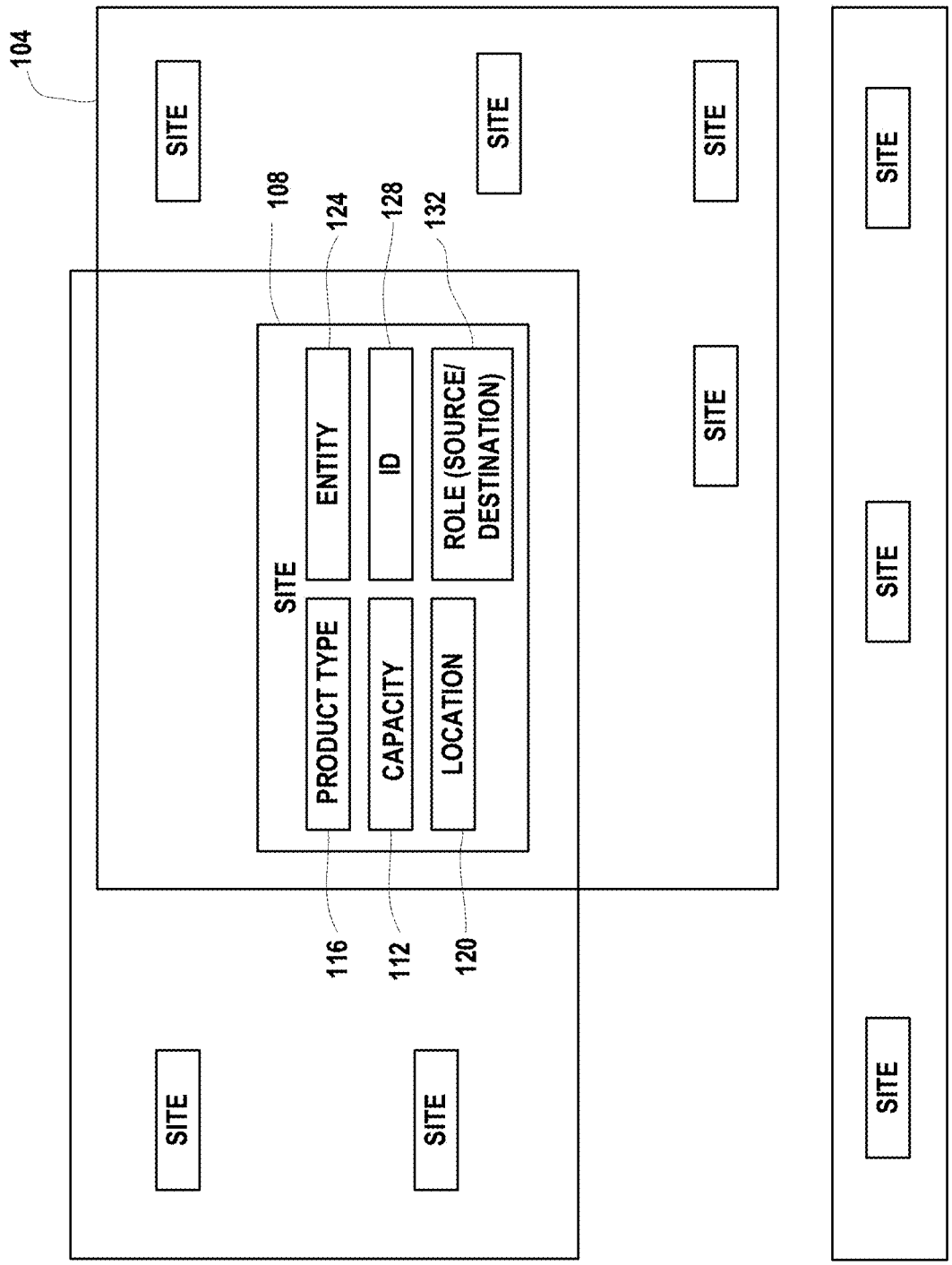
FIG. 1 is a schematic diagram illustrating a number of networks made up of physical bulk item storage sites in a geographic area.

Before discussing the physical bulk asset hauling dispatching optimization utilities disclosed herein, initial reference is made to FIG. 1 which presents a schematic diagram illustrating a number of networks 104 made up of physical bulk item storage sites 108 in a geographic area. Each site 108 may generally be configured to store one or more capacities 112 of one or more types 116 of physical bulk assets such as petroleum products, water, sand, gravel, and/or the like. Furthermore, each site 108 may be disposed at a particular location 120 (e.g., GPS coordinates), be managed by a particular entity 124, be identified by one or more IDs 128, and have a role 132 in the nature of a bulk asset source and/or a bulk asset destination. As shown, each network 104 may include one of more sites 108, where one or more of the sites 108 may in some arrangements be present in two or more networks 104.

Figure 2:
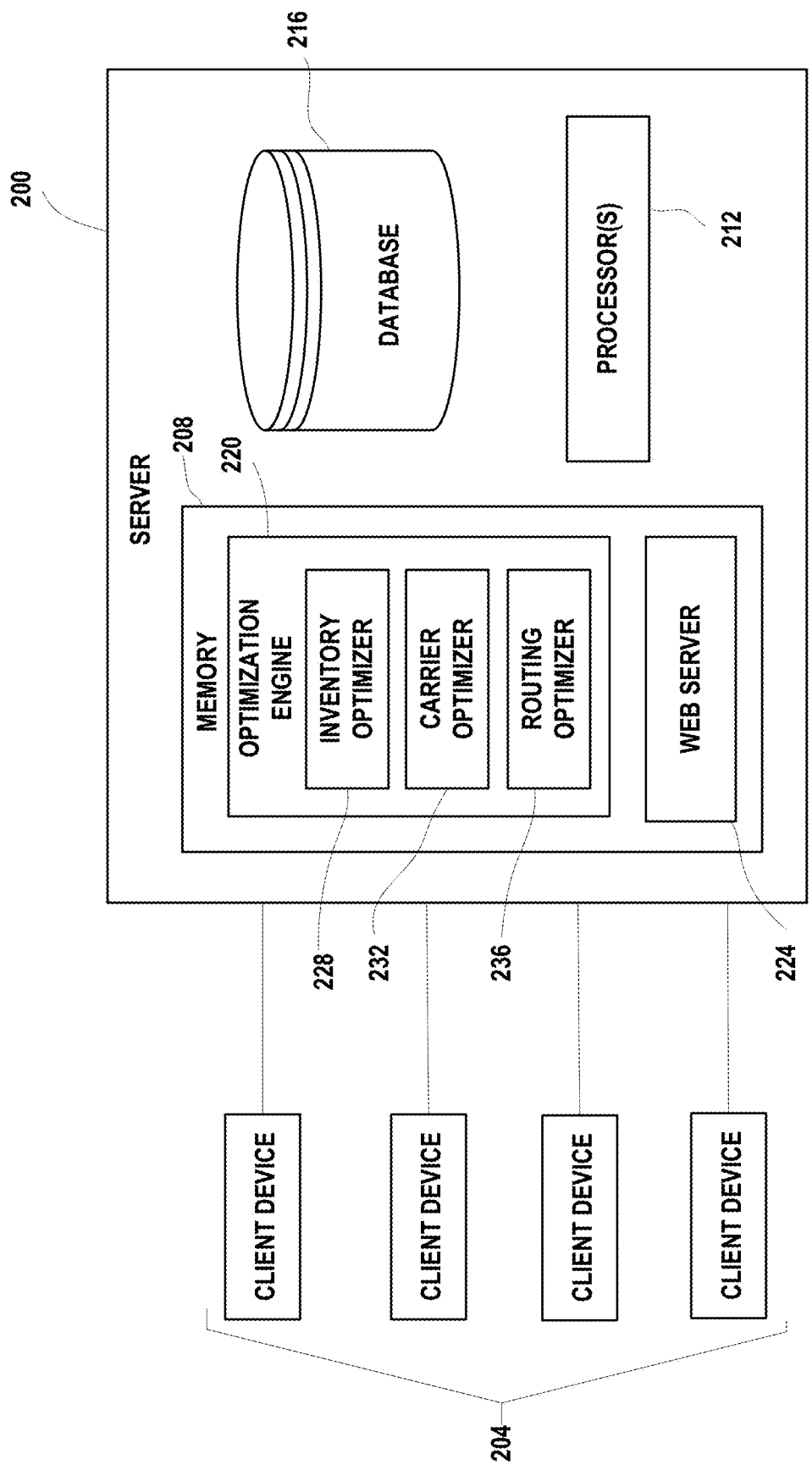
FIG. 2 is a block diagram of a server that is configured to communicate with client devices and generate optimized data usable by various types of users to minimize costs and maximize production in the hauling of produced physical bulk assets (e.g., liquids, sand, etc.) to various destinations in a network.

FIG. 2 presents a block diagram of a server 200 that is configured to communicate with client devices 204 over one or more networks (e.g., Internet, WANs, LANs, not shown) and generate optimized data usable by various types of users to minimize costs and maximize production in the hauling of produced physical bulk assets (e.g., liquids, sand, etc.) to various destinations in a network. Broadly, the server 200 includes at least one memory device 208 (e.g., RAM or other volatile memory device(s)), at least one processor 212 (e.g., processing core(s)) for executing computer readable instructions from the memory device 208, at least one storage module 216 (e.g., hard disk, flash, or other non-volatile memory), and/or various other peripheral devices or components (e.g., display, input devices, etc.), all of which may be interconnected by one or more busses (not shown).

The storage module 216 may store input information (e.g., bulk asset inventories, production forecasts, capacity information, etc., discussed in more detail below) received from client devices 204 (or other sources) as well as the results of any analyses performed on the information by the server 200 according to any appropriate structured arrangement that allows for efficient input and retrieval of data (e.g., RDBMS). While the server 200 is illustrated as a single device (e.g., server, laptop, desktop, mobile device, and/or other computing device), one or more functionalities or processes of the server 200 may be allocated among a number of machines or devices which may or may not be embodied in a single housing. For instance, a first set of one or more functionalities could be handled by a first machine or group of machines or processes while a second set of one or more functionalities could be handled or performed by a second machine or group of machines or processes.

As shown, the memory 208 may be configured to store (e.g., as loaded from storage module 216) an optimization engine 220 (e.g., application middleware in the form of one or more sets of computer-readable instructions executable by the processor 212) that is configured to employ certain optimization methods in a unique manner to implement a decision-making framework for making the optimal bulk asset dispatch decisions for producers, carriers, destinations, and the like, all while decreasing the manual effort required to complete each dispatch. For instance, a producer interested in only particular functionalities of the optimization engine 220 (e.g., only in relation to optimal inventory levels, carriers, and markets, but not specific routing) can supply producer specific input to the system (which may include one or more producer-specific restraints) and receive output recommendations by the system in relation to trucks, loads, destinations, and the like. Continuing with this example, a particular hauler contracted with the producer may utilize a different mechanism or functionality of the system to optimize routing for the recommendations outputted by the system in relation to the producer but free of access to the producer specific data inputted into the system by the producer. The disclosed system may generate data (e.g., producing location, the amount to haul, the earliest arrival time, the latest departure time, the carrier, the truck, and the destination) for a carrier to complete a haul from a producing location to a destination in a manner that optimizes parameters for system users.

The server 200 may include a web server 224 that handles system and user interaction and send requests to the optimization engine 220. The optimization engine 220 is generally configured to read and write data to the RDBMS of storage module 216 and which may include the updating of transactional data, scheduling of jobs, and administration of the applications. While not shown, a job agent may read and write data specific to the execution of requested jobs (e.g., where job status may be the primary update) while individual worker nodes may write output to the RDBMS directly. In one arrangement, the server 200 may run within its own private network with the web server 224 being the only public-facing interface.

As shown in FIG. 2, the optimization engine may generally include an inventory optimizer 228, a carrier (hauler) optimizer 232, and a routing optimizer 236. The inventory optimizer 228 generally represents the mechanism for making decisions specific to a producer of a network (e.g., of one of the networks 104 in FIG. 1). Generally, each producer may be interested in flow assurance for each producing site (e.g., each site 108 in FIG. 1 whose role is a "source") and/or substantial full utilization of their hauling capacity (e.g., whether contracted or owned hauling capacity). An output of the inventory optimizer 228 may be an optimized load data package that generally defines bulk asset loads that are to be transported from one or more source sites to one or more destination sites in the network according to one or more deadlines in order to maintain such flow assurance and realize substantial full utilization of the producer's hauling capacity.

The carrier optimizer 232 generally represents the mechanism for making decisions specific to a producer who can realize different results by using different carriers or sending produced bulk assets to different markets (e.g., different destinations). An output of the carrier optimizer 232 may be an optimized carrier assignment data package that matches specific carriers and trucks with loads to be delivered from one or more particular source sites to one or more particular destination sites to minimize or at least reduce the cost of delivery of the bulk assets. The routing optimizer 236 generally represents the mechanism for recommending decisions for individual truck shifts and generates an optimized routing data package that minimizes or at least reduces time, mileage, and/or other costs incurred as part of delivering requested loads to destinations. For instance, a carrier can receive load requests from producers and then utilize the routing optimizer 236 to design truck shifts to meet the requirements of the load requests while minimizing or at least reducing their own costs.

Figure 3:
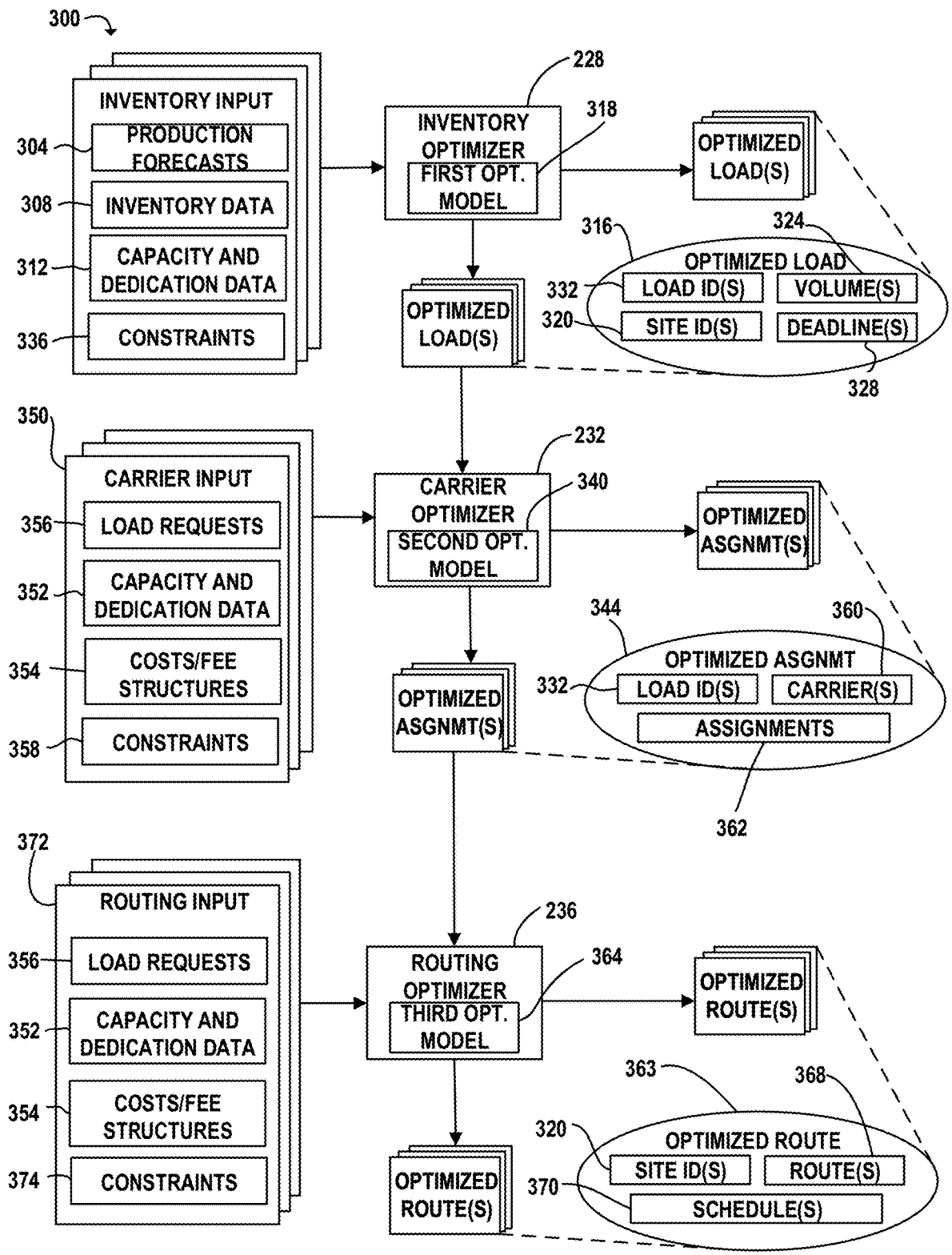
FIG. 3 is a schematic flow diagram illustrating the operation of various optimization processes executed by the optimization engine of FIG. 2.

FIG. 3 is a schematic flow diagram illustrating the operation of various optimization processes executed by the optimization engine 220 of FIG. 2. More specifically, FIG. 3 illustrates how the inventory optimizer 228, the carrier optimizer 232, and the routing optimizer 236 can be combined to achieve a single, flexible system that is capable of serving multiple different types of customers. The system is capable of substantially seamlessly passing optimized data packages between optimizers in a manner that limits parties from knowing all of the original data inputted by the other party. Furthermore, the diagram illustrates how users can take advantage of one or all of the optimizers by supplying differing input data.

Figure 4:
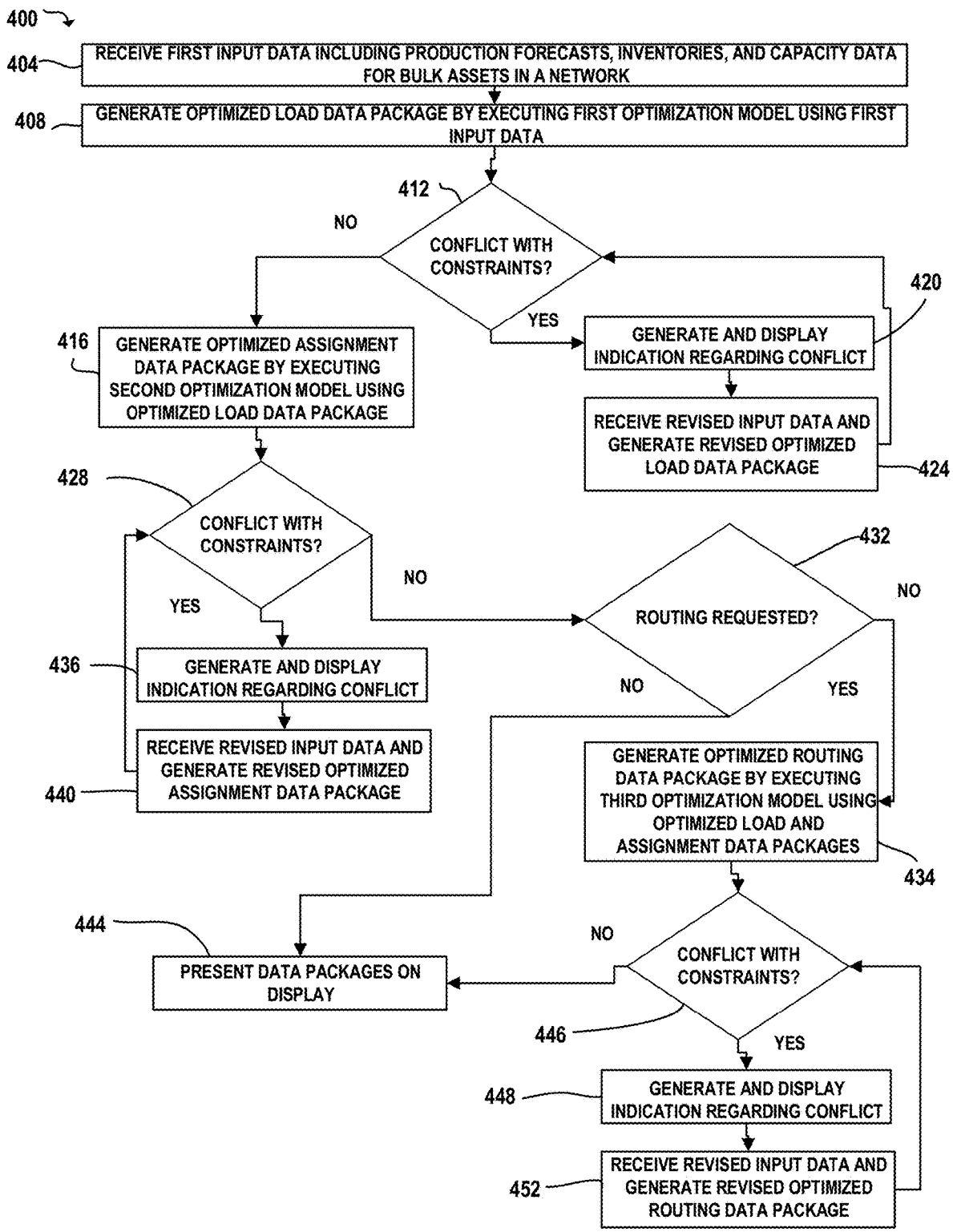
FIG. 4 is a flow diagram of a method for use in facilitating transport of physical bulk assets between sites in a network.

Reference is also now made to FIGS. 4 and 5a-5j. FIG. 4 presents a flow diagram of a method 400 for use in facilitating transport of physical bulk assets between sites in a network. FIGS. 5a-5j present screenshots of a user interface usable by customers (e.g., via client devices 204) to utilize the optimization engine 220. At operation 404 in FIG. 4, the server 200 may receive (e.g., from a customer such as a producer via a client device 204) first input data 300 that includes production forecasts 304, inventories 308, and capacity data 312 for physical bulk assets in a network. For instance, the first input data 300 may be supplied by or on behalf of a producer of a particular type of physical bulk asset (e.g., oil, water, sand, etc.) in a network of source and destination sites and carriers. Broadly, the production forecast data 304 represents a projected or forecasted production (or acquisition) of the particular type of bulk asset at all sites in the network under consideration for a particular forward-looking period of time. The production forecasts may be quantified in any appropriate manner such as by barrels, cubic units (cubic meters), other volumetric measures, and/or the like. The inventory data 308 broadly represents a current volume or quantity of the particular type of bulk asset at all sites in the network under consideration and may be in the nature of granular data with respect to each particular site. The inventory data 308 may also include historical production rates with respect to each site. The capacity and dedication data 312 broadly represents minimum and maximum capacities of available hauling resources (e.g., available carriers) as well as minimum and maximum capacities of delivery points (sites).

Figure 5C:
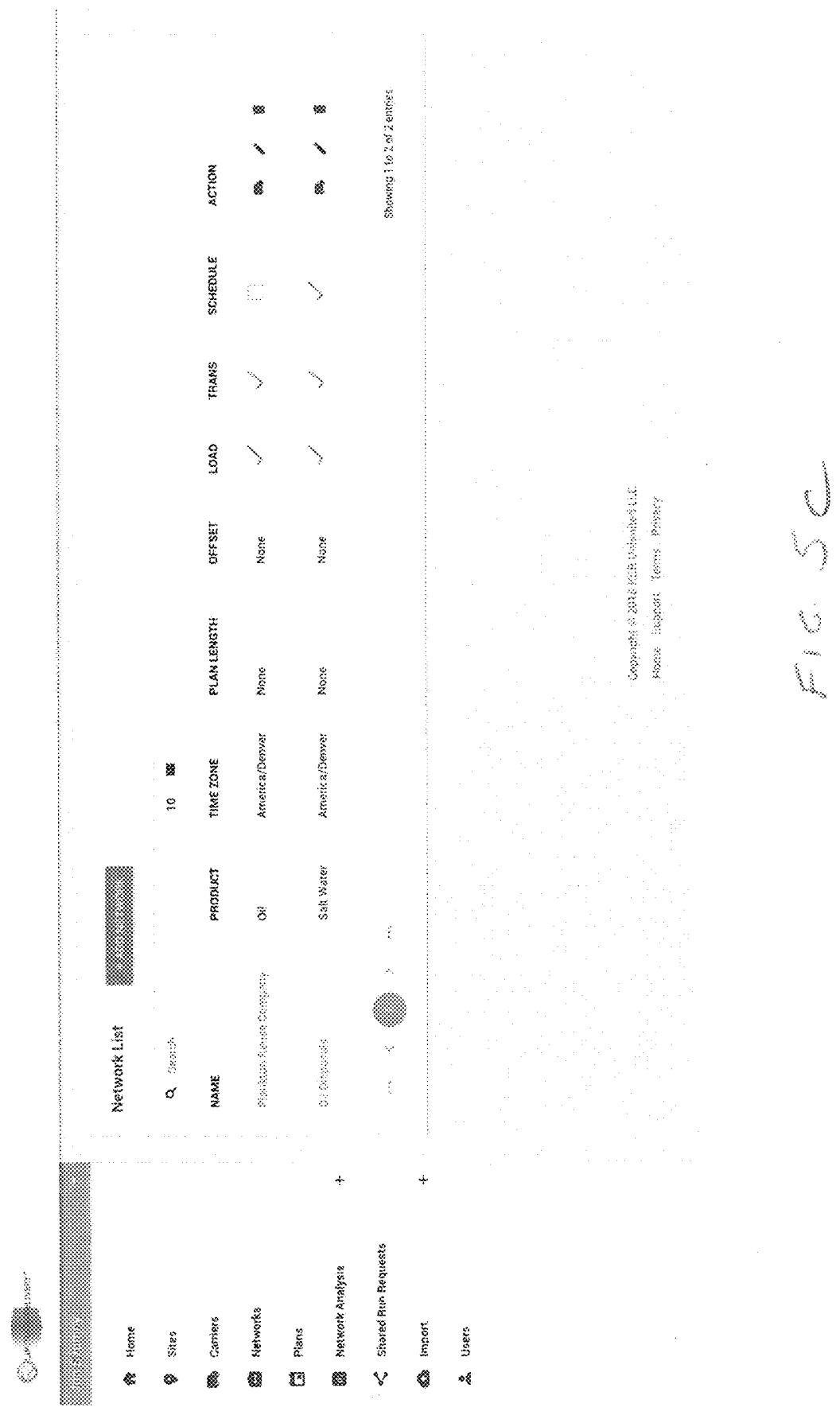
Figure 5F:
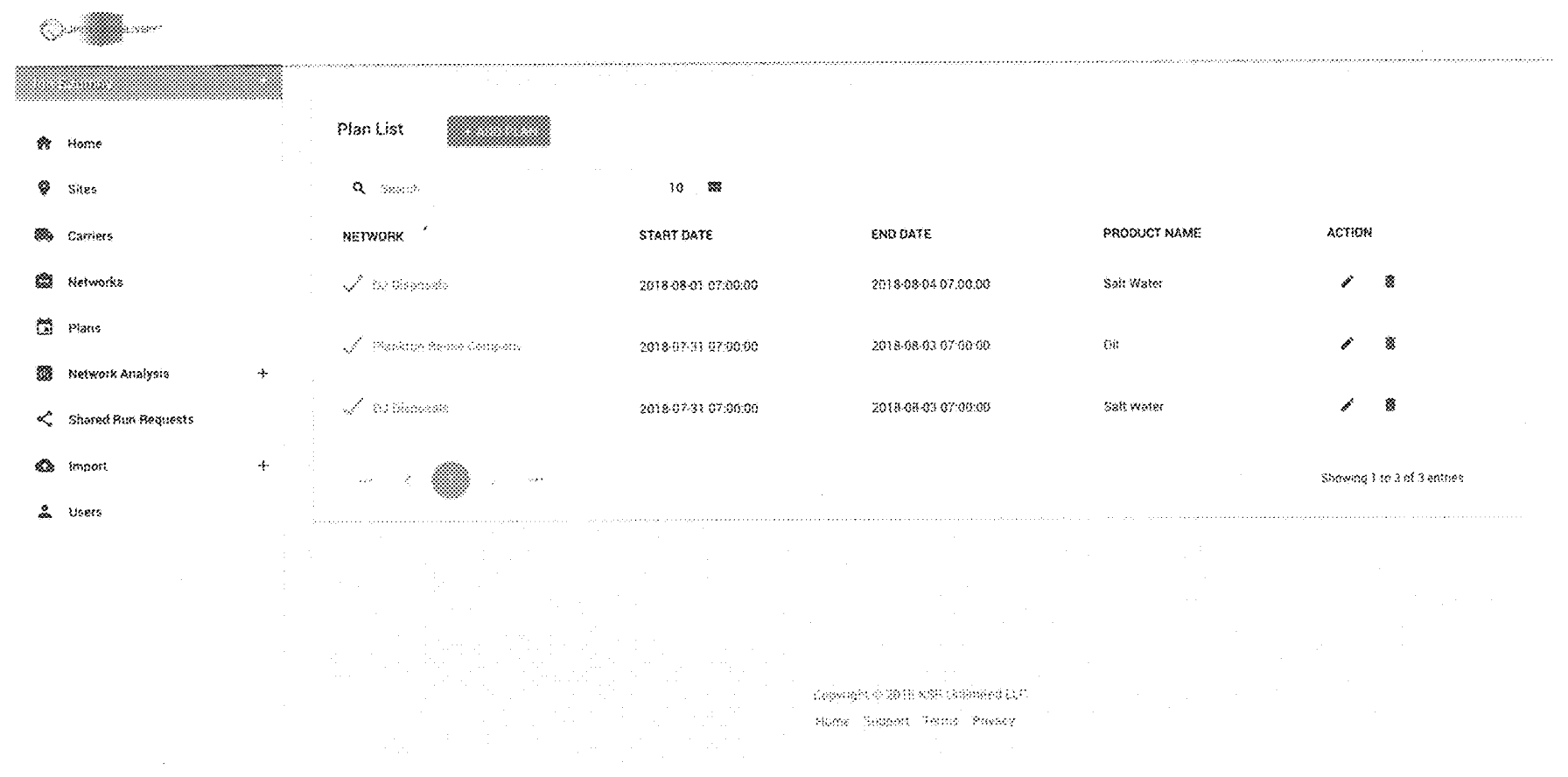
Figure 5H:
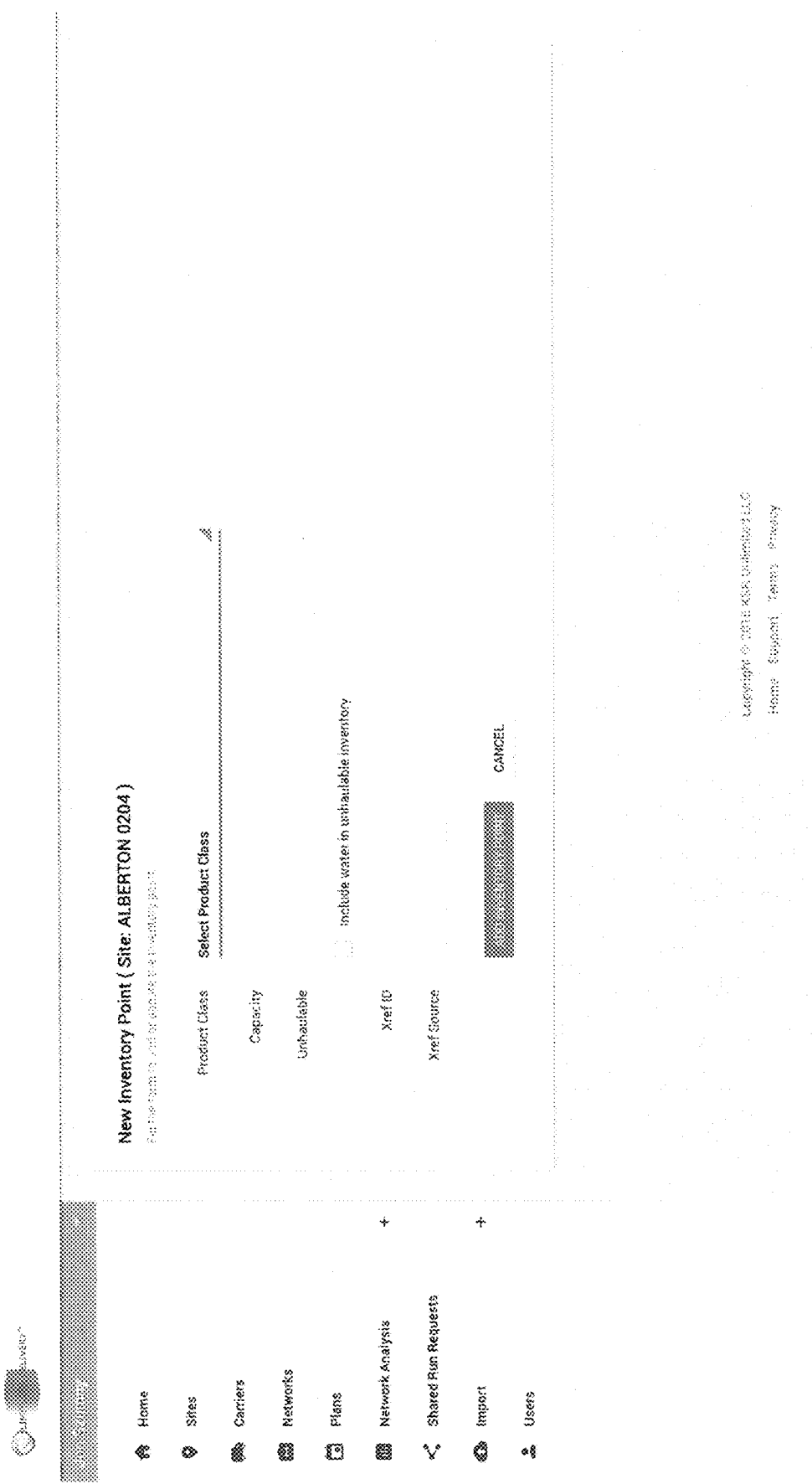

The first input data 300 may be supplied to the server 200 in any appropriate manner, whereby the server 200 may store the first input data 300 in a RDBS of storage module 216 in any appropriate manner. As one example, some or all of the first input data 300 may be retrieved from one or more sources via web application programming interfaces (APIs) or the like. Additionally or alternatively, customers may manually input data to the server 200. For instance, FIG. 5a-5j present screenshots of a user interface that a customer may utilize to interact with the server 200. As shown in FIG. 5a, the customer may initially establish a plurality of sites (e.g., via clicking the "Sites" icon on the left side of the interface and then clicking "ADD SITE"). The server 200 may prompt the customer to input various identifying information for the particular site such as name, corporation, division, role, time zone, location (e.g., GPS coordinates such as latitude/longitude), IDs, and the like. Similarly, the customer may initially establish a plurality of carriers (e.g., via clicking the "Carriers" icon on the left side of the interface) and then clicking "ADD CARRIER" See FIG. 5b. The server 200 may prompt the customer to input various identifying information for the particular carrier such as name, IDs, and the like.

As shown in FIG. 5c, the customer may also create one or more networks whereby the server 200 may prompt the customer to input various identifying information for the particular network such as name, product type, time zone, sites, carriers, and the like. For instance, FIG. 5d illustrates a list of all of the sites associated with the "Plankton Reuse Company" network, where the sites in FIG. 5d include all or a subset of the sites entered in FIG. 5a. Furthermore, FIG. 5e illustrates a list of all of the carriers (only one shown in this example) associated with this network, where the carriers in FIG. 5d include all or a subset of the carriers entered in FIG. 5b.

To supply the first input data 300 to the server 200 via the user interface, the customer may click on the "inventory input" button (e.g., see left side of FIG. 5a) whereupon the user can import (e.g., via csv files, etc.) the input information. For instance, such imported input may include the IDs or other identifying information previously created in the system such that upon import, the various inputted information (e.g., production forecasts 304, inventories 308, and capacity data 312) may be automatically associated with the appropriate respective site, carrier, or the like. With reference to FIG. 5a for instance and after drilling into one of the sites (e.g., by clicking on one of the icons on the right side of the screenshot), a user may be able to view the entered inventory information associated with the particular site as shown in FIG. 5g. Alternatively, a user can click the "add inventory point" button in FIG. 5g to bring up the screenshot in FIG. 5h to allow the user to manually enter inventory information associated with the site.

Returning to FIG. 4, the method 400 may then include generating 408 (e.g., via the inventory optimizer 228) an optimized load data package 316 by executing a first optimization model 318 using the first input data 300. The first optimization model may be any appropriate standard optimization model such as a stochastic inventory model or the like. Broadly, the optimized load data package 316 represents an optimized load and sets forth one or more load parameters that, when implemented by the network, maintain flow assurance in the network and allow the network to realize substantial full utilization of the hauling capacity. As an example, the load package 316 may include a plurality of site IDs 320 that are sources of the particular bulk asset or destinations of the particular bulk asset in the network. For instance, each site ID 320 may correspond to one of the sites associated with the particular network (e.g., from FIG. 5d) and thus automatically be linked with role (e.g., source or destination), capacities, etc. The optimized load data package 316 may also include other parameters such as a volume parameter 324 (e.g., particular volumes of the bulk assets at particular sites or to be moved to particular sites), deadlines 328 (e.g., dates by which bulk assets need to be moved from one or more source sites to one or more destination sites), a load ID 332 (e.g., an ID that uniquely identifies the load in the server 200), and/or the like.

Figure 5I:
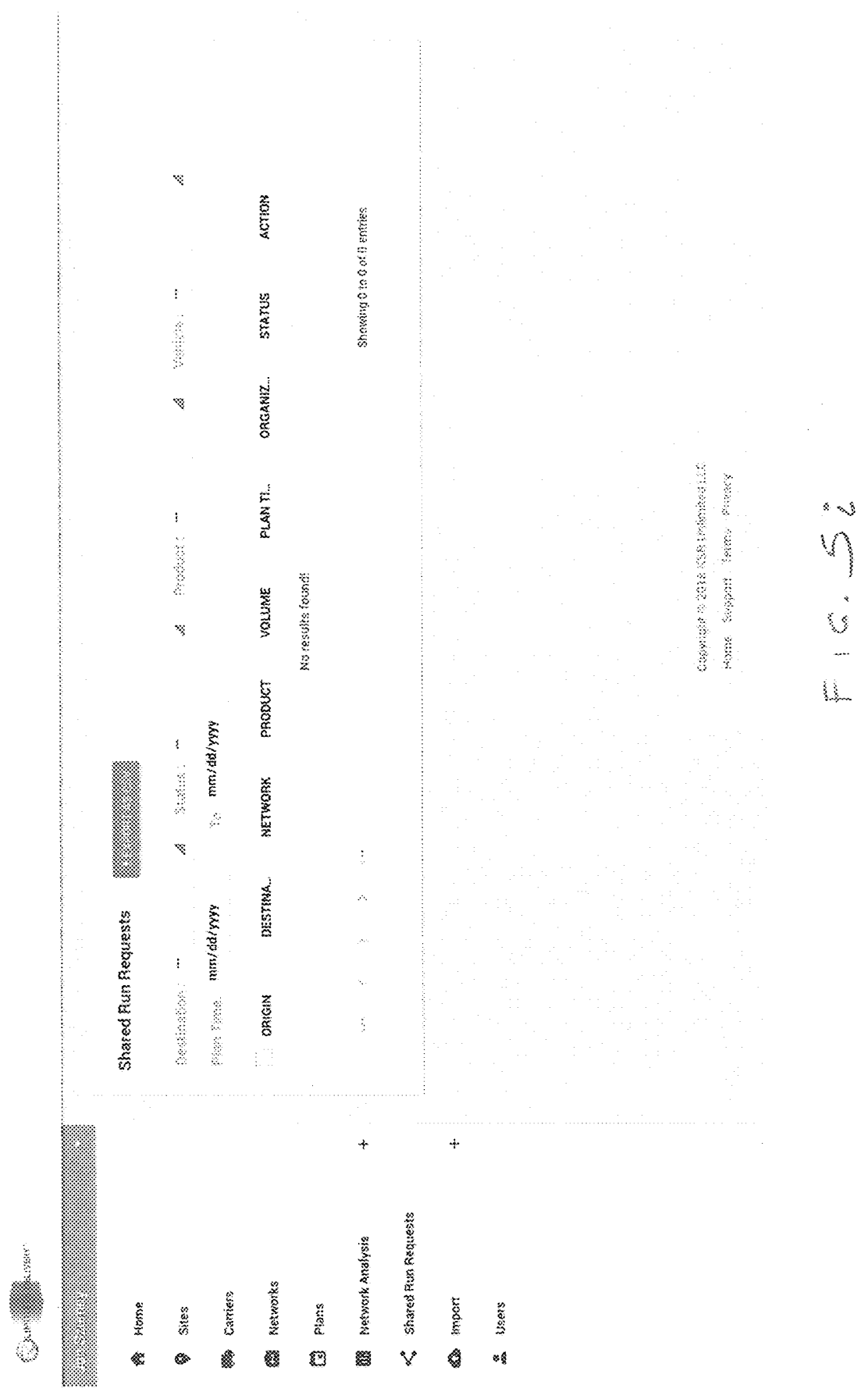

In one arrangement, a customer may be able to select one or more of the various optimizers to be run by the optimization engine 220 such as via accessing the "network list" of the user interface (see FIG. 5c) and selecting "load" to trigger the inventory optimizer 228, "trans" to trigger the carrier optimizer 232, and/or "schedule" to trigger the routing optimizer 236. For each network, the customer may be able to create one or more "plans" that are each made up of one or more periods of time for which to run the selected optimizer(s). As shown in FIG. 5f, for instance, a customer has established two different plans for the "DJ Disposals" network, one running from Aug. 1, 2018 to Aug. 4, 2018 and another running from Jul. 31, 2018 to Aug. 3, 2018. Upon drilling into one of the plans (e.g., via click on one of the network names in the plan list in FIG. 5f), the user may be directed to the screenshot of FIG. 5j. In one arrangement, separate respective buttons may be included (e.g., see top of page) to allow the user to execute those optimizers selected for the corresponding network in the screenshot of FIG. 5c.

Returning to FIG. 4, and after generating the optimized load data package, the method 400 may include querying 412 whether the optimized load package 316 conflicts with any constraints 336 supplied by the user and/or acquired by the server. As one example, the constraints 336 may include particular deadlines (e.g., dates, times) to be met, minimum carrier filling capacity to be utilized, bulk asset volumes, and/or the like. Additionally or alternatively, the constraints 336 may include any appropriate industry standards, state/federal regulations, and/or the like to be met. Still further, a constraint 336 may be a production forecast 304 greater than site and/or carrier capacity during the plan period. The various constraints 336 may be manually supplied by the user (e.g., via the "Import" button in FIG. 5a) and/or may be automatically obtained by the server 200 in any appropriate manner (e.g., via APIs, web scraping, etc.).

Responsive to an affirmative answer to the query at 412, the method may proceed to generate and display 420 an indication regarding the conflict. As an example and with reference to the screenshot in FIG. 5j, the middle of the page includes several types of risks that may be encountered if an optimized load data package conflicts with one or more restraints 336. For instance, at site "Conrad 5104," there is a risk of a projected inventory being greater than an inventory capacity at the site. Various other types of risks are envisioned and encompassed herein (e.g., "inventory overflow risks," etc.). The method 400 may then proceed to receive revised input data from the customer/user and then generate 424 a revised optimized load data package. Upon observing the above risk at the Conrad 5104 site, the user may choose to supply revised input data to the server 200 and then rerun the inventory optimizer 228. For instance, the user may choose to add actual physical capacity (e.g., tanks, barrels, etc.) to the Conrad 5104 site, update the corresponding capacity information for the Conrad 5104 site (e.g., via the screenshot of FIG. 5g), and then rerun the inventory optimizer 228 (e.g., via clicking the load "rerun" or "execute" button in FIG. 5j. In one arrangement, a user may be able to override one or more of the risks by way of clicking an "override" button or the like (not shown) or by not rerunning the inventory optimizer 228.

In response to receiving revised input data and again generating an optimized load data package at 424, the method 400 may return to the query 412. In response to a negative answer to the query, the method 400 may proceed to generate 416 (e.g., via the carrier optimizer 232) an optimized carrier assignment data package 232 by executing a second optimization model 340 (different than the first optimization model 318) using the optimized load data package 316. Stated differently, the optimized load data package 318 may be substantially seamlessly transferred by the optimization engine 220 as input directly into the carrier optimizer 232 for generation of the optimized carrier assignment data package 232. The second optimization model 340 may be any appropriate standard optimization model such as a generalized transportation model or the like. In addition to the optimized load data package 316 being fed directly into the carrier optimizer 232, the carrier optimizer 232 may also receive at least some carrier-specific input 350 for use in generating the optimized carrier assignment data package 344.

For instance, some of the carrier input 350 may be granular capacity/dedication data 352 as well as costs/fee structures that are specific to each particular carrier associated with the network (e.g., each carrier in the list of FIG. 5e, only one carrier being illustrated in the example of FIG. 5e). As one simplified example, a first carrier could have a capacity of 75 loads of 200 barrels/load and a fee structure of $90/hour, a second carrier could have a capacity of 25 loads of 200 barrels/load and a fee structure of $100/hour, and a third carrier could have a capacity of 50 loads of 150 barrels/load and a fee structure of $60/hour. In some embodiments, the server 200 may receive fee structure input at $/hour, $/barrel, and/or $/load.

In one arrangement, the input 300, 350 may be provided by the user and/or obtained by the server 200 before running of either of the inventory or carrier optimizers 228, 232, whereupon the inventory optimizer 228 executes the first optimization model 318 using the input it needs while the carrier optimizer 232 executes the second optimization model 340 using the input it needs as discussed above. In relation to the aggregate capacity/dedication data 312 and the granular carrier-specific capacity/dedication data 352, the user in some embodiments need only supply (or the server 200 need only obtain) the granular carrier-specific capacity/dedication data 352 and then the server 200 may be configured to appropriately aggregate such data 352 to obtain the aggregate capacity/dedication data 312 for use by the inventory optimizer 228.

In some situations, a user may be able to submit one or more "load requests" 356 for use by the carrier optimizer 232 in generating optimized carrier assignment load packages 344, where each load request 356 includes some or all of the parameters of an optimized load package 316. As one example, a user may choose to not execute the inventory optimizer 228 and only execute the carrier optimizer 232 which needs some or all of the information that would have been present in a generated optimized load package such as particular site IDs 320, deadlines, 328, etc. In this regard, the user may manually supply such information as part of a load request 356. Alternatively, in the case where the optimized load data package 316 is incomplete (e.g., missing one or more parameters), such parameters may be supplied as part of a load request 356. Still further, a user may supply a load package 356 even if the user also chooses for the inventory optimizer 228 to generate an optimized load data package 316 whereupon the carrier optimizer 232 may serve to assess the parameters in the optimized load data package 316 with corresponding parameters in the load request 350 to identify if any conflicts exist (e.g., as part of the query 428 discussed below). In this regard, the parameters of such load request 356 may essentially serve as constraints 358 (e.g., although a user may also submit additional constraints 358).

Figure 5J:
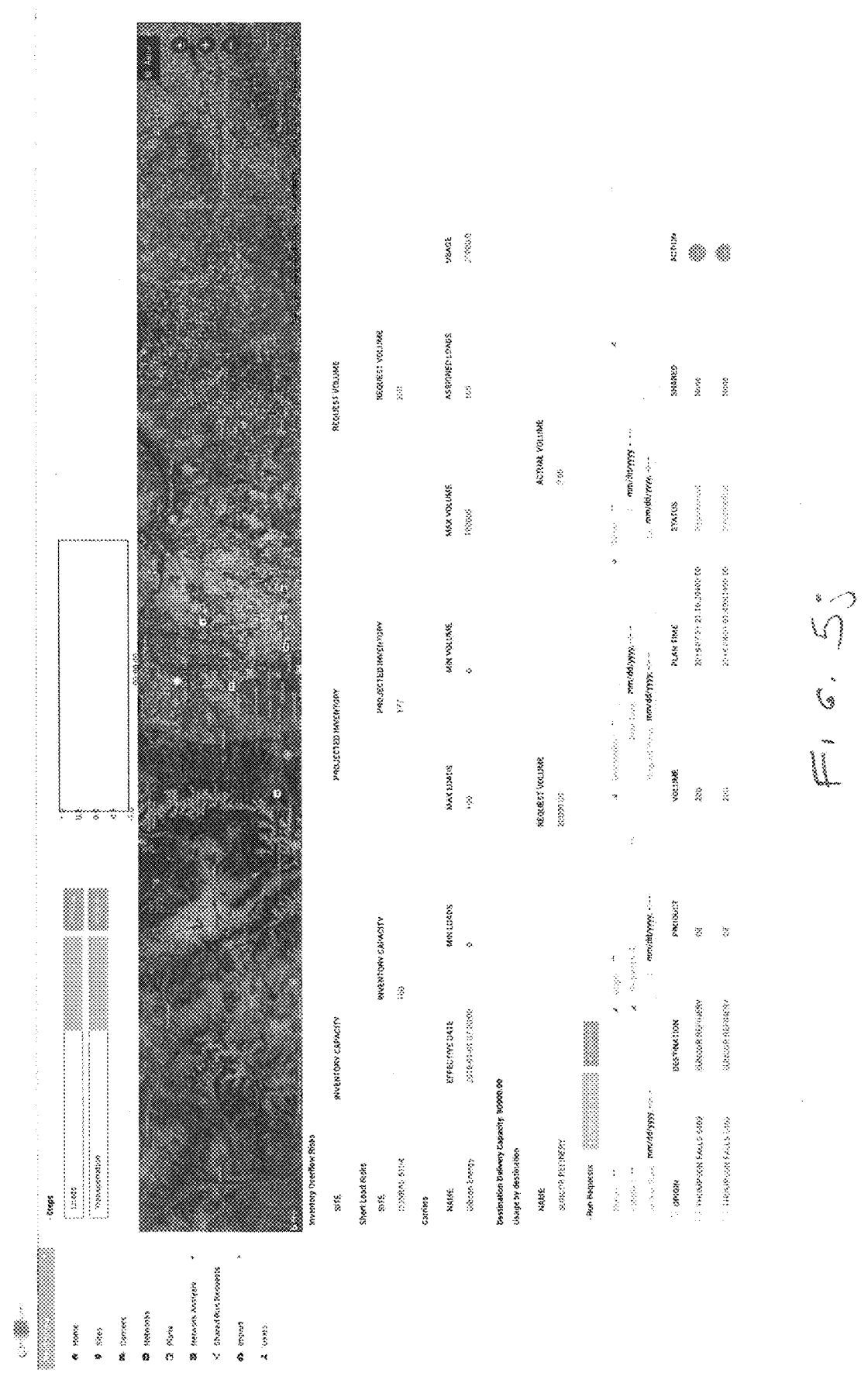

At operation 428, the method 400 may query whether there are conflicts with any restraints 358 (e.g., which may be encompassed in a load request 350 as discussed above). In response to an affirmative answer to the query 428, the method 400 may proceed to generate and display 436 an indication regarding the conflict and then receive revised input data and generate 440 a revised optimized carrier assignment data package. For instance, the middle of FIG. 5j presents various types of conflict risks that may occur if the optimized carrier assignment data package was implemented. In some embodiments, a user may again have the option to manually override or otherwise ignore such risks. In any case, each optimized carrier assignment data package 344 may include one or more parameters or pieces of data such as one or more load IDs 332, one or more carrier IDs 360, and one or more assignments 362 between load IDs 332 and carrier IDs 360 (e.g., where each assignment generally stipulates one or more particular loads for which one or more particular carriers are responsible).

In response to a negative answer to the query 428, the method 400 may proceed to query 432 whether specific routing is requested for the optimized loads 316 and optimized carrier assignments 344. In response to a negative answer to the query 432 (i.e., the user does not want the optimization engine 220 to generate specific routing for the optimized carrier assignment data package 344), the method 400 may proceed to present 444 the data packages on the display. It is to be understood that the operation 444 need not always necessarily occur only after all of the above discussed steps. In other words, one or more of the data packages may be displayed (e.g., in the screenshot of FIG. 5j) as data is received and the optimizers 228, 232 are run. For instance, while FIG. 5j presents conflict risks that may occur, FIG. 5j also displays the optimized carrier assignment data package (e.g., in the nature of carrier names, assigned loads, etc. at the middle of the page) even before a user chooses what to do with the risks. In the event the user chooses to supply revised input information in response to viewing the risks, the server 200 may proceed to rerun the various optimizers whereupon the displayed optimized carrier assignment data package may automatically update. In any case, the user may then choose to actually implement the recommendations in the optimized carrier assignment data package 344 in any appropriate manner such as via exporting the generated data to another data system, triggering implementation directly from the user interface, and/or the like.

In response to an affirmative answer to the query 432 (i.e., the user does want the optimization engine 220 to generate specific routing for the optimized carrier assignment data package 344), the method 400 may proceed to generate 434 (e.g., via the routing optimizer 236) an optimized routing data package 363 by executing a third optimization model 364 using the optimized load and carrier assignment data packages 316, 344. For instance, the third optimization model 364 may be based off of decision-making platforms supplied by Google® or the like. Each optimized routing data package 363 may include various pieces of data such as site IDs 320, routes/directions 368, schedules 370, and/or the like. Of note, the optimized carrier assignment data package 344 may be substantially seamlessly fed directly into the routing optimizer 236 for use in generating optimized routing data packages 363. The routing optimizer 236 may also make use of other user or server-supplied input 372 such as, for example, one or more constraints 374 (e.g., highways on which the user does not want carriers to travel).

As discussed previously herein, the optimization engine 200 is able to accommodate different users with different interests in the bulk asset dispatch process. For instance, producers that have substantially full control over the carriers used to transport their bulk assets may make use of all of the inventory optimizer 228, the carrier optimizer 232, and the routing optimizer 236. In other situations, however, producers may hire carriers to transport bulk assets but have little to no control over the specific routing used by the carriers to transport the bulk assets between sites in the producers' networks. That is, a carrier in charge of specific truck shifts may receive load requests from producers (or site operations) regarding particular volumes of bulk assets to be moved between particular sites and want to utilize the routing optimizer 236 of the optimization engine 220 to optimize specific routes between the sites to minimize their own handling expenditures.

In one arrangement, the routing optimizer 236 may receive manually input load requests 356, capacity/dedication data 352, and costs/fee structures 354 and generate optimized routing data packages 363 for use by the carriers. For instance, the carrier may receive data files that include such aforementioned data and then import such data into the disclosed system for use by the routing optimizer 236. In another arrangement, a carrier may be able to coordinate with a producer so that optimized carrier assignment data packages 344 generated for the producer are automatically received at the routing optimizer 236 for use in generating optimized routing data packages 363 for the carrier but free of granting access to the input data 300, 350 used by the server 200 to generate the optimized load and carrier assignment data packages 316, 344. In this situation, for instance, the carrier may not have access to and/or be unaware of constraints 336, 358, production forecasts 304, and/or the like. The carrier or other user may also be able to input constraints 374 to be used by the routing optimizer 236 in determining 446 whether any conflicts exist, generating and displaying 448 corresponding indications, and then receiving revised input and generating 452 revised optimized routing data packages 363 that comply with such restraints 374. The carrier or other user may also be able to input costs/fee structures 354 and the like (e.g., which can also serve as constraints 374).

At the discretion of the user, whether by manual or automated process, loads assigned to certain carriers can be shared with the carriers so that users from the appropriate carrier organizations can access the system and view the loads assigned to them from other organizations with the data sufficient to allow them to run the routing optimizer 236. Data pertaining to sites which have no loads shared with a carrier organization are not available to the carrier organization through the "Shared Run Requests" functionality. See FIGS. 5i-5j. For instance, a user can access the shared run requests through file export or API to feed their fleet management systems or other processes.

The optimization engine 220 can be used in various manners to achieve various bulk asset dispatch optimizations for various entities with differing interests such as production operators (producers) commonly known as oil and gas exploration and production companies; oil or water haulers (carriers); water disposal/recycle operators or oil markets (destination); and/or the like. As one example, a user may need to manage inventory but does not need to make decisions on who hauls the fluids (e.g., such as when oil is purchased at the wellhead by a single purchaser and the purchaser makes the hauler and destination decision). In this case, the user could only execute the inventory optimizer 228 and input their minimum and maximum volumes and/or loads per day (e.g., data 300 in FIG. 3) dictated by the purchaser.

As another example, a user may need to manage the inventory and also need to decide who hauls the fluids and/or where the deliveries are to be made. In this case, the user could enter the capacities for haulers and/or delivery points as well as fee structures for hauling and disposing/selling the fluids and then execute both of the inventory and carrier optimizers 228, 232. As a further example, a user may not need to manage the inventory at the source locations but needs to decide which haulers/carriers are assigned specific loads and/or where the deliveries are to be made. In this case, the user may utilize only the carrier optimizer 232 by way of manually providing load requests 356 as well as capacity/dedication data 352 and costs/fee structures 354 that are specific to individual carriers. The load requests 356 may in some cases be optimized in other manners; however, in this case, optimized load data packages 316 would not be generated and automatically transferred from the inventory optimizer 228 to the carrier optimizer 232.

The various data packages disclosed herein may be output in any appropriate manner. As discussed herein, the data packages may be output in the nature of graphics, charts, maps, and/or the like on a user interface. Additionally or alternatively, the data packages may be output to other processes or locations such as to an electronic ticketing system, a data warehouses, analytical tools, and/or the like.

The disclosed utilities reflect an improvement in physical bulk asset dispatching between one or more source sites and one or more destination sites in a network as they provide a single solution that can be used in different manners by different entities in the dispatch process (e.g., producers, carriers, destination operators, etc.) to realize various efficiencies specific to the entity.

It will be readily appreciated that many deviations may be made from the specific embodiments disclosed in the specification without departing from the spirit and scope of the invention. The illustrations and discussion herein have only been provided to assist the reader in understanding the various aspects of the present disclosure. In some arrangements for instance, the disclosed optimization engine may be configured to generate specific recommended input changes to be made to avoid detected conflicts between data packages and constraints. It is to also be understood that the method 400 may in some arrangements be performed in other manners than as specifically shown in FIG. 4. Furthermore, one or more various combinations of the arrangements and embodiments disclosed herein are also envisioned.

For instance, it is envisioned that the functionalities of the inventory optimizer 228 and carrier optimizer 232 could be combined into a single optimizer, whereby the output of such optimizer may be an optimized package including the data of the optimized load package 316 and optimized assignment package 344 of FIG. 3. In this arrangement, the single optimizer may make use of the first optimization model 318, the second optimization model 340, and/or another optimization model.

Inputs to the disclosed system may be received in any appropriate manner. As discussed herein, inputs may be received through a user interface such as that shown in the figures. Additionally or alternatively, inputs may be received via voice interaction or the like.

Some features that are described in the context of a single embodiment can also be implemented in multiple embodiments separately or in any suitable subcombination. Furthermore, methods discussed herein may be practiced with more, fewer, different steps than as specifically presented herein. Moreover, although features may be described above as acting in certain combinations and even initially claimed as such, one or more features from a claimed combination can in some cases be separated from the combination, and the claimed combination may be directed to a subcombination or variation of a subcombination.

Embodiments disclosed herein can be implemented as one or more computer program products, i.e., one or more modules of computer program instructions encoded on a computer-readable medium for execution by, or to control the operation of, data processing apparatus. For example, the optimization engine 220 responsible for the various functionalities disclosed herein may be provided in such computer-readable medium of the server 200 and executed by the processor(s) 212 as appropriate. The computer-readable medium can be a machine-readable storage device, a machine-readable storage substrate, a non-volatile memory device, a composition of matter affecting a machine-readable propagated signal, or a combination of one or more of them. In this regard, processor(s) may encompass one or more apparatuses, devices, and machines for processing data, including, by way of example, a programmable processor, a computer or multiple processor or computers. In addition to hardware, the server 200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the server 200 may comprise one or more of various types of devices, including, but not limited to a personal computer system, desktop computer, laptop, notebook, netbook computer, mainframe computer system, handheld computer, workstation, network computer, application server, storage device, a consumer electronics device, a peripheral device such as a switch, modem, router, or, in general, any type of computing or electronic device.

The foregoing description of the present invention has been presented for purposes of illustration and description. Furthermore, the description is not intended to limit the invention to the form disclosed herein. Consequently, variation and modifications commensurate with the above teachings, skill and knowledge of the relevant art, are within the scope of the present invention. For instance, in some embodiments, configuring a rack may be applicable in other contexts, such as parcel delivery, bulk shipping containers, storage units, and the like. The embodiments described hereinabove are further intended to explain best modes known of practicing the invention and to enable others skilled in the art to utilize the invention in such, or other embodiments and with various modification required by the particular application(s) or use(s) of the present invention. It is intended that the appended claims be construed to include alternative embodiments to the extent permitted by the prior art.

What is claimed is:

1. A method for use in facilitating transport of physical assets between sites in a network, comprising:
receiving, at a processor, first input data including a current inventory of physical assets in a network made up of a plurality of physical sites in a geographic area, forecasted production of physical assets at one or more of the plurality of physical sites in the network, a current capacity to store physical assets at sites in the network, and a hauling capacity by carriers accessible to the network;
generating by the processor at least one optimized load data package that is configured to maintain flow assurance of physical assets in the network, the generating the at least one optimized load data package including executing at least a first optimization model using the first input data, wherein the at least one optimized load data package includes a first quantity of at least one physical asset in the network to be transported from at least one source site in the network to at least one destination site in the network;
generating by the processor at least one optimized carrier assignment data package that is configured to limit a cost to deliver physical assets between sites in the network using the carriers, the generating the at least one optimized carrier assignment data package including executing at least a second optimization model using the at least one optimized load data package; and sending by the processor the at least one optimized carrier assignment data package for presentation on a display.

2. The method of claim 1, wherein the at least one optimized load data package includes at least one first deadline by which the first quantity of the at least one physical asset is to be transported from the at least one source site in the network to the at least one destination site in the network.

3. The method of claim 1, further including:
receiving, at the processor, at least one requested load data package;
determining, by the processor, whether at least one inconsistency exists between the at least one optimized load data package and the at least one requested load data package; and
generating, by the processor, at least one indication regarding the determination for presentation on the display.

4. The method of claim 3, wherein the determining includes determining that the at least one inconsistency exists between the at least one optimized load data package and the at least one requested load data package.

5. The method of claim 4, further including:
receiving at the processor, responsive to the generated at least one indication, revised first input data;
generating by the processor at least one revised optimized load data package that is configured to maintain flow assurance of physical assets in the network, the generating the at least one revised optimized load data package including executing the at least a first optimization model using the revised first input data;
determining, by the processor, whether at least one inconsistency exists between the at least one revised optimized load data package and the at least one requested load data package; and
generating, by the processor, at least one indication regarding the determination for presentation on the display.

6. The method of claim 5, further comprising:
receiving, at the processor, second input data from one of the carriers accessible to the network that includes one or more cost structures for the carrier in the network, and
wherein the determining whether at least one inconsistency exists between the at least one revised optimized load data package and the at least one requested load data package includes that at least one inconsistency exists between the at least one revised optimized load data package and the at least one requested load data package, and wherein the generating by the processor the at least one optimized carrier assignment data package includes executing the at least a second optimization model using the second input data and the at least one revised optimized load data package.

7. The method of claim 5, further including:
ascertaining by the processor, responsive to the determining that the at least one inconsistency exists between the at least one optimized load data package and the at least one requested load data package, a particular portion of the first input data to be revised, wherein the at least one indication includes the particular portion of the first input data, and wherein the revised first input data revises the particular portion of the first input data.

8. The method of claim 4, further including:
receiving, at the processor, second input data from a carrier accessible to the network that includes one or more cost structures for the carrier in the network; and receiving at the processor, responsive to the generated at least one indication, a signal that the at least one inconsistency is to be ignored, wherein the generating by the processor the at least one optimized carrier assignment data package by executing the at least a second optimization model using the second input data and the at least one revised optimized load data package proceeds responsive to the received signal.

9. The method of claim 3,
wherein the at least one optimized load data package includes at least one first deadline by which the first quantity of the at least one physical asset is to be transported from the at least one source site in the network to the at least one destination site in the network, and
wherein the at least one requested load data package includes a second deadline to transport the first quantity of the at least one physical asset in the network from the at least one source site in the network to the at least one destination site in the network, and wherein the at least one inconsistency exists when the processor determines that the first deadline is after the second deadline.

10. The method of claim 3, wherein the at least one requested load data package includes a second quantity of the at least one physical asset in the network to be transported from the at least one source site to the at least one destination site, and wherein the at least one inconsistency exists when the the first quantity of the at least one physical asset differs from the second quantity of the at least one physical asset.

11. The method of claim 2, wherein the at least one optimized carrier assignment data package includes the at least one optimized load data package, and wherein the at least one optimized carrier assignment data package specifies at least one carrier to transport the first quantity of the at least one physical asset in the network from the at least one source site in the network to the at least one destination site in the network by the at least one first deadline.

12. The method of claim 11, further including:
generating by the processor at least one optimized physical asset routing data package that is configured to limit the cost to deliver the first quantity of the at least one physical asset between sites in the network using the at least one carrier, the generating the at least one optimized physical asset routing data package including executing at least a third optimization model using the at least one optimized load data package and the at least one optimized carrier assignment data package; and
sending by the processor the at least one optimized physical asset routing data package for presentation on the display.

13. The method of claim 12, wherein the at least one optimized physical asset routing data package specifies at least one specific route to be traveled by the at least one carrier to transport the first quantity of the at least one physical asset in the network from the at least one source site in the network to the at least one destination site in the network by the at least one first deadline.

14. The method of claim 13, further including:
receiving, at the processor, second input data from a carrier accessible to the network and that includes one or more cost structures for the carrier accessible to the network, wherein each cost structure includes a currency per unit cost for hauling physical assets in the network, and wherein the generating the at least one optimized physical asset routing data package includes using the second input data.

15. The method of claim 14, further including:
inhibiting by the processor access to the first input data to the carrier in the network.

16. The method of claim 1, wherein the hauling capacity by the carriers accessible to the network in the first input data includes hauling capacity data for each of a plurality of the carriers accessible to the network.

17. The method of claim 16, further including:
generating, by the processor using the hauling capacity data for each of the plurality of the carriers accessible to the network, aggregate hauling capacity data, wherein the generating the at least one optimized load data package includes using the aggregate hauling capacity data, and wherein the generating the at least one optimized carrier assignment data package includes using the hauling capacity data for each of the carriers accessible to the network.

18. The method of claim 1, wherein the first input data further includes one or more cost structures for the carriers accessible to the network, and wherein each cost structure includes a currency per unit cost for hauling physical assets in the network.

19. One or more memory devices encoding computer-executable instructions for executing a computer process, the computer process comprising:
receiving first input data including a current inventory of physical assets in a network made up of a plurality of physical sites in a geographic area, forecasted production of physical assets at one or more of the plurality of physical sites in the network, a current capacity to store physical assets at sites in the network, and a hauling capacity by carriers accessible to the network;
generating at least one optimized load data package that is configured to maintain flow assurance of physical assets in the network, the generating the at least one optimized load data package including executing at least a first optimization model using the first input data, wherein the at least one optimized load data package includes a first quantity of at least one physical asset in the network to be transported from at least one source site in the network to at least one destination site in the network;
generating at least one optimized carrier assignment data package that is configured to limit a cost to deliver physical assets between sites in the network using the carriers, the generating the at least one optimized carrier assignment data package including executing at least a second optimization model using the at least one optimized load data package; and
sending the at least one optimized carrier assignment data package for presentation on a display.

20. A system, comprising:
a memory; and
an optimization engine stored in the memory and executable by a processor to:
receive first input data including a current inventory of physical assets in a network made up of a plurality of physical sites in a geographic area, forecasted production of physical assets at one or more of the plurality of physical sites in the network, a current capacity to store physical assets at sites in the network, and a hauling capacity by carriers accessible to the network;
generate at least one optimized load data package that is configured to maintain flow assurance of physical assets in the network, the generating the at least one optimized load data package including executing at least a first optimization model using the first input data, wherein the at least one optimized load data package includes a first quantity of at least one physical asset in the network to be transported from at least one source site in the network to at least one destination site in the network;
generate at least one optimized carrier assignment data package that is configured to assign at least one carrier to deliver physical assets between sites in the network using the carriers, the generating the at least one optimized carrier assignment data package including executing at least a second optimization model using the at least one optimized load data package; and
send the at least one optimized carrier assignment data package for presentation on a display.

* * * * *